US006970305B2

(12) United States Patent
Katagishi et al.

(10) Patent No.: US 6,970,305 B2
(45) **Date of Patent: *Nov. 29, 2005**

(54) LENS BARREL

(75) Inventors: Yuichi Katagishi, Setagaya-ku (JP); Noriyasu Kotani, Shinagawa-ku (JP)

(73) Assignee: Nikon Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 10/951,707

(22) Filed: Sep. 29, 2004

(65) Prior Publication Data

US 2005/0046975 A1 Mar. 3, 2005

Related U.S. Application Data

(63) Continuation of application No. 10/688,918, filed on Oct. 21, 2003, now Pat. No. 6,819,503.

(30) Foreign Application Priority Data

Oct. 28, 2002 (JP) ............................ 2002-312387

(51) Int. Cl.[7] ......................... G02B 15/14; G03B 17/00

(52) U.S. Cl. ...................... 359/702; 359/694; 359/696; 359/819; 396/52; 396/55

(58) Field of Search ................................ 359/702, 704, 359/694, 696, 819; 396/52, 55

(56) References Cited

U.S. PATENT DOCUMENTS

| | | | | |
|---|---|---|---|---|
| 5,881,324 | A | 3/1999 | Imada | 396/52 |
| 5,881,325 | A | 3/1999 | Imura et al. | 396/55 |
| 5,883,742 | A | 3/1999 | Kamata | 359/557 |
| 5,974,270 | A | 10/1999 | Imura et al. | 396/55 |
| 6,718,131 | B2 | 4/2004 | Okazaki et al. | 396/55 |
| 2004/0057710 | A1 | 3/2004 | Terao | 396/52 |

FOREIGN PATENT DOCUMENTS

JP A-11-271833 10/1999

*Primary Examiner*—Loha Ben
(74) *Attorney, Agent, or Firm*—Oliff & Berridge, PLC

(57) ABSTRACT

A lock pin is inserted into a hole of a lens holding frame in order to lock a blur correction lens when blur correction is not executed. An optical axis of the blur correction lens and an optical axis of a photographic optical system match when the blur correction lens and the lens holding frame have fallen in the gravitational direction by their own weight and the lock pin and the hole have come into contact with each other.

19 Claims, 7 Drawing Sheets

LENS BARREL

CROSS-REFERENCE TO RELATED APPLICATIONS

This is a Continuation of application Ser. No. 10/688,918 filed Oct. 21, 2003, and published as U.S. Patent Publication No. 20040085639 on May 6, 2004, now U.S. Pat. No. 6,819,503 B2. The entire disclosure of the prior application is hereby incorporated by reference herein in its entirety. The disclosure of the following priority application is herein incorporated by reference: Japanese Patent Application No. 2002-312387 filed Oct. 28, 2002.

BACKGROUND OF THE INVENTION

1. Field of Invention

The present invention relates to a lens barrel capable of correcting a blur occurring in a subject image, which is used in an optical apparatus such as a camera.

2. Description of Related Art

Blur correction systems in the related art include a system that moves a blur correction optical system in a direction substantially perpendicular to an optical axis with an actuator, such as a voice coil motor (VCM).

For instance, a blur correction device disclosed in Japanese Laid-Open Patent Publication No. 11-271833 comprises a locking device that holds a blur correction optical system at a specific position, that is, locks the blur correction optical system while it is not engaged in blur correcting operation.

FIGS. 6 and 7 show sectional view of part of a lens barrel having a blur correction device in the related art.

When performing blur correction, electric current is supplied to a coil 20 to move a blur correction lens L and control its position in two directions perpendicular to an optical axis O and also perpendicular to each other. The blur correction lens L needs to be kept at a fixed position while blur correction is not performed. However, a great deal of power will be consumed if power is always supplied to the coil 20 to keep the position of the blur correction lens L.

When image blur in an image plane is unlikely to occur and blur correction is not being performed, there is no need to move a lens holding frame 10. In this case, the lens holding frame 10 and the blur correction lens L are locked by moving a lock pin 70*b* in a direction of the optical axis O to be inserted into a hole 10*b*, as shown in FIG. 6.

With the lens barrel in the related art, the locking operation is executed when an optical axis OL of the blur correction lens L and the optical axis O of a photographic optical system have matched with each other. In addition, the internal diameter of the hole 10*b* is set larger than the outside diameter of the lock pin 70*b* so that the lock pin 70*b* is inserted in the hole 10*b* with a high degree of reliability.

After the lock pin 70*b* is inserted into the hole 10*b*, power supply to the coil 20 is cut off, and thus locking operation is completed.

FIG. 7 shows the lens barrel shown in FIG. 6, which is in a state where the lock pin 70*b* and the hole 10*b* are engaged with each other and power supply to the coil 20 has stopped.

The lens holding frame 10 falls in a direction of gravity (a direction of arrow G shown in FIG. 7) under its own weight upon stopping of power supply to the coil 20. The lens holding frame 10 will no longer fall after the lock pin 70*b* and the hole 10*b* come into contact with each other, as shown in FIG. 7.

However, if power supply to the coil 20 has stopped and the lens holding frame 10 has fallen by its own weight, the optical axis OL of the blur correction lens L shifts from the optical axis O of the photographic optical system so that they become eccentric. There is a problem in that the optical performance of the photographic optical system slightly deteriorates when the optical axis OL of the blur correction lens L and the optical axis O of the photographic optical system do not match with each other.

SUMMARY OF THE INVENTION

The present invention is to provide a lens barrel having blur correction function, allowing the photographic optical system to work as effective as possible while blur correction is not performed.

A lens barrel according to the present invention, comprises: a main optical system; a blur correction optical system included in the main optical system, that corrects image blur by moving along directions intersecting an optical axis of the main optical system; a lens holding frame that holds the blur correction optical system and is allowed to move along the directions intersecting the optical axis of the main optical system; a blur correction drive unit that drives the blur correction optical system and the lens holding frame; and a lock mechanism that restricts movement of the blur correction optical system and the lens holding frame, leaving a play, when blur correction is not executed; wherein: the lock mechanism comprise a frame engaging portion provided at the lens holding frame and a movable engaging portion that moves substantially along the optical axis of the main optical system and is capable of engaging with the frame engaging portion; an optical axis of the blur correction optical system matches the optical axis of the main optical system when the movable engaging portion and the frame engaging portion are in contact with each other, after the movable engaging portion moves to a position to engage with the frame engaging portion and the blur correction optical system and the lens holding frame move in a predetermined direction by the play.

It is preferable that the predetermined direction corresponds to a direction from the optical axes to a bottom portion of a camera body at which the lens barrel has been mounted.

A lens barrel according to the present invention, comprises: a main optical system; a blur correction optical system included in the main optical system, that corrects image blur by moving along directions intersecting an optical axis of the main optical system; a lens holding frame that holds the blur correction optical system and is allowed to move along the directions intersecting the optical axis of the main optical system; a blur correction drive unit that drives the blur correction optical system and the lens holding frame; a lock mechanism that restricts movement of the blur correction optical system and the lens holding frame when blur correction is not executed, the lock mechanism comprising a frame engaging portion provided at the lens holding frame and a movable engaging portion that moves substantially along the optical axis of the main optical system and is capable of engaging with the frame engaging portion; and a biasing device that applies force to the lens holding frame and the blur correction optical system along a direction intersecting with the optical axis of the main optical system when the movable engaging portion has moved to a position to engage with the frame engaging portion.

It is preferable that an optical axis of the blur correction optical system and the optical axis of the main optical system match when the movable engaging portion and the frame engaging portion are caused to be in contact with each other by the biasing device. It is preferable that the biasing device is the blur correction drive unit.

It is preferable that the direction along which the biasing device applies the force to the lens holding frame and the blur correction optical system corresponds to a direction from the optical axes to a bottom portion of a camera body at which the lens barrel has been mounted. It is preferable that the main optical system is a photographic optical system that forms an image of a subject to be photographed; and the biasing device starts applying the force to the lens holding frame and the blur correction optical system immediately before photographing and continues applying the force at least while photographing.

The frame engaging portion may be a hole provided in the lens holding frame, facing substantially along the optical axis of the main optical system; and the movable engaging portion may be a lock pin capable of being inserted into the hole.

A camera system according to the present invention comprises a camera body and a lens barrel as described above.

DETAILED DESCRIPTION OF PREFERRED EMBODIMENTS

The following is a detailed explanation of an embodiment of the present invention, given reference to FIGS. 1 through 5. In FIGS. 1 through 4, it is assumed that gravity acts in a direction of arrow G, that is, a downward direction in the figures.

Figure 5:
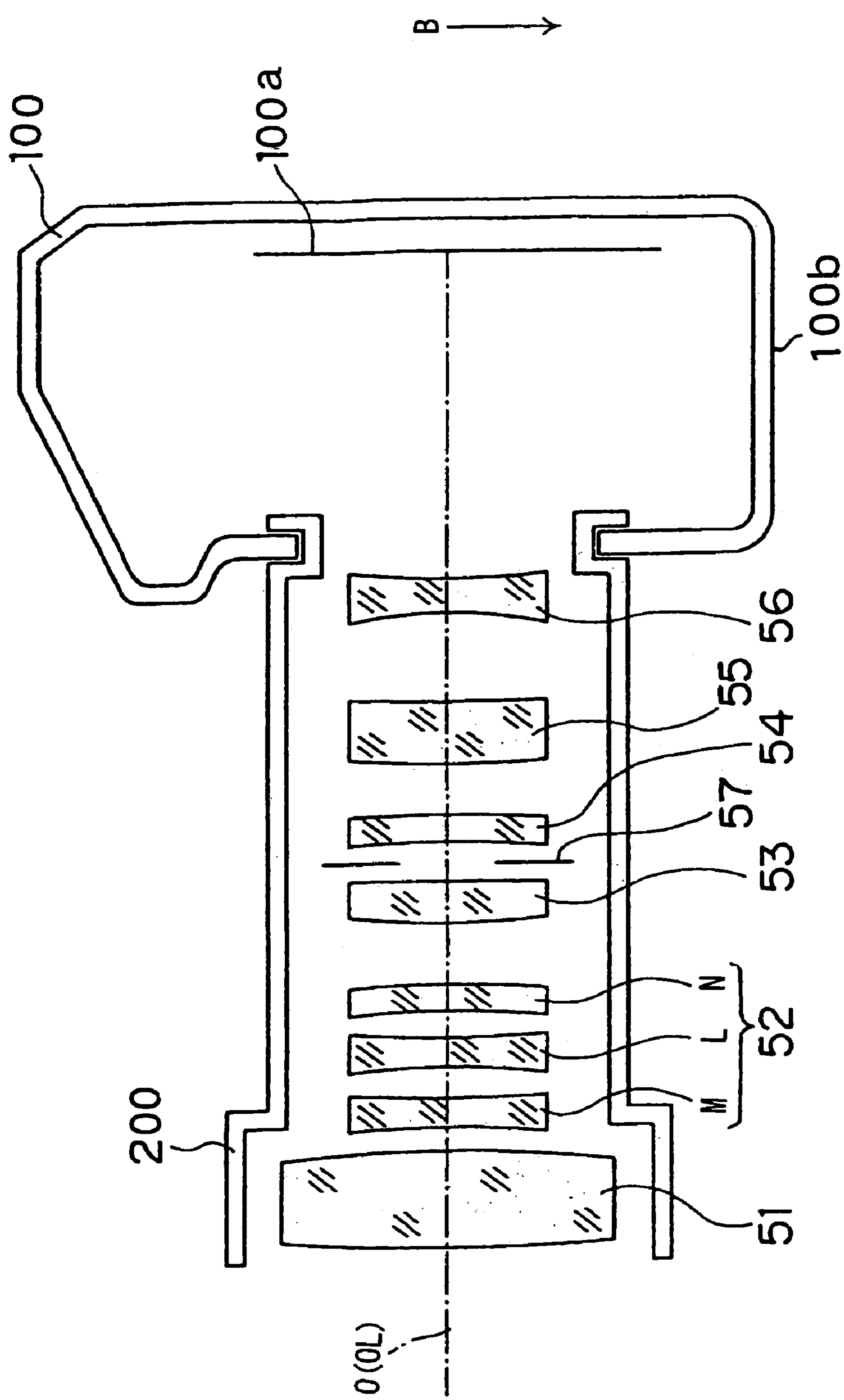
FIG. 5 is a sectional view of a camera system at which the lens barrel shown in FIG. 1 is mounted.
Figure 6:
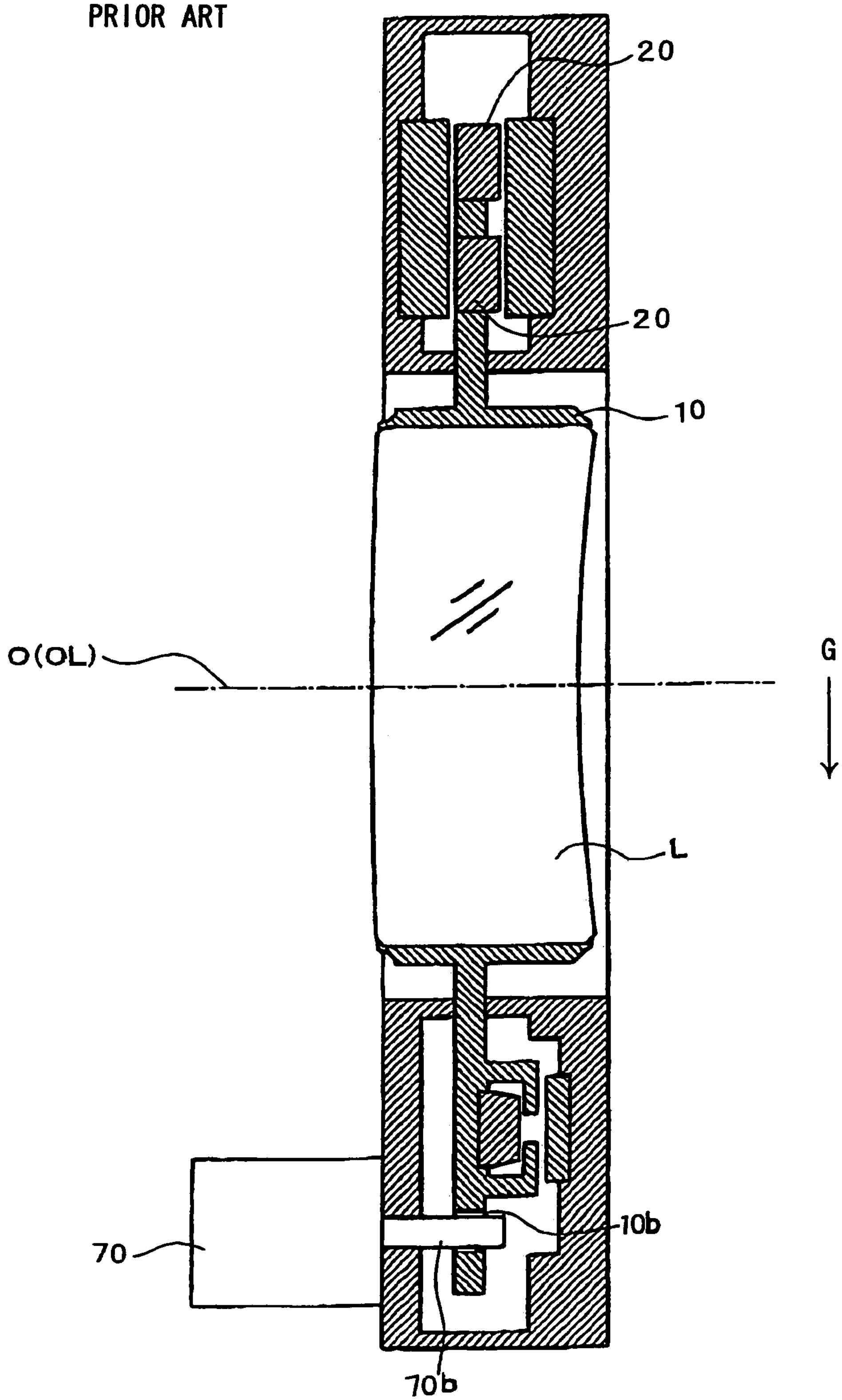
FIG. 6 shows a lens barrel in a related art, wherein a lock pin has just engaged with a hole.
Figure 7:
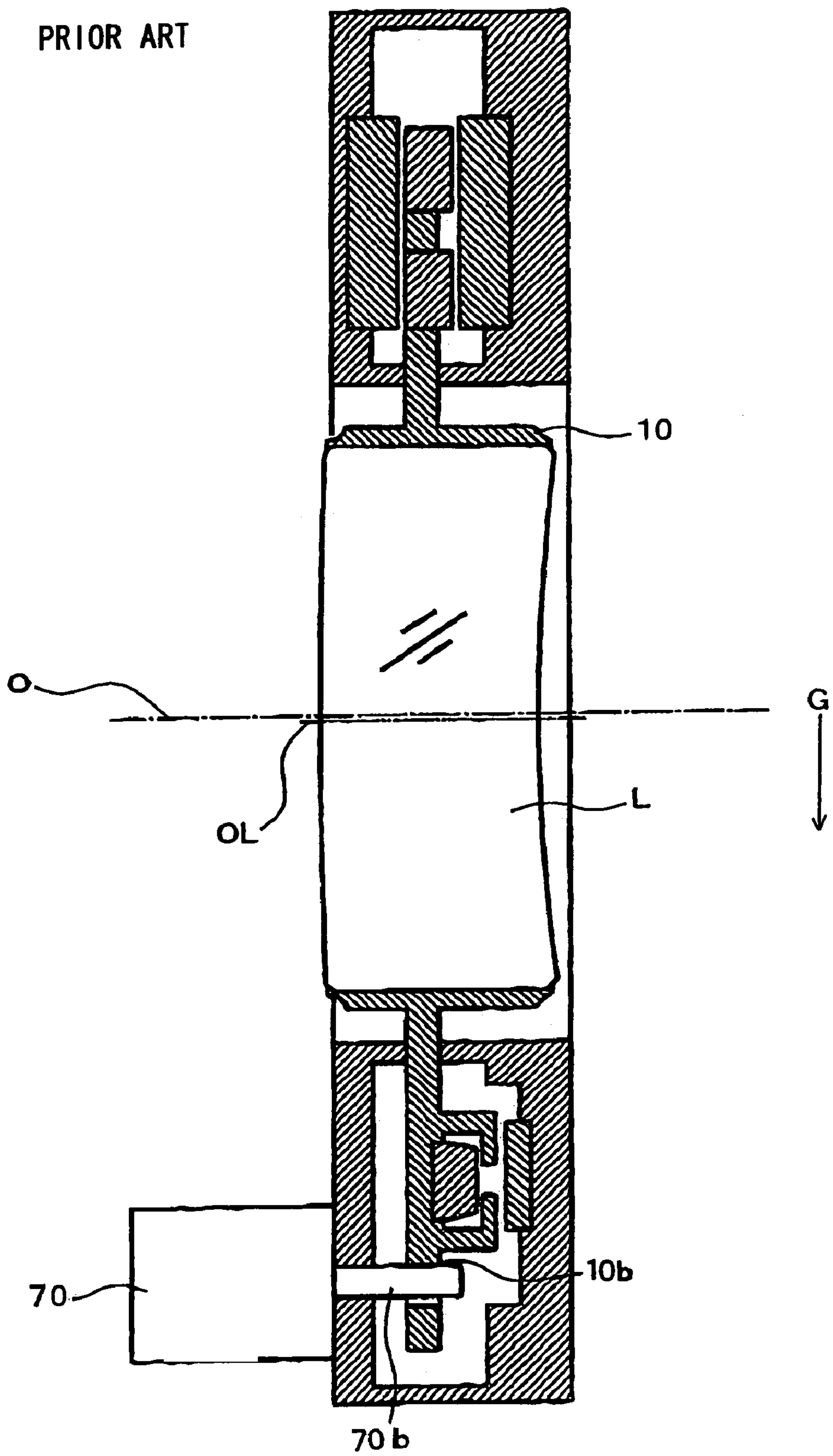
FIG. 7 shows the lens barrel in a related art, wherein the lock pin and the hole are engaged with each other and power supply to a coil has stopped.

FIG. 5 shows a sectional view of a camera system at which a lens barrel 200 according to the embodiment of the present invention is mounted. The camera system comprises a camera body 100 and the lens barrel 200.

The lens barrel 200 can be detachably mounted at the camera body 100. The lens barrel 200 is a zoom lens with six lens groups which includes a first lens group 51, a second lens group 52, a third lens group 53, a fourth lens group 54, a fifth lens group 55, a sixth lens group 56, and an aperture 57. A photographic optical system comprises these lens groups 51 through 56 and the aperture 57.

The magnification factor is altered by causing the first lens group 51, the third lens group 53, the fifth lens group 55, the sixth lens group 56 and the aperture 57 to move along a direction of an optical axis O in the lens barrel 200.

The first lens group 51 is a focal adjustment lens group that forms an image of a subject at an image plane 100*a* by moving along the direction of the optical axis O.

The second lens group 52 and the fourth lens group 54 do not move along the direction of the optical axis O when adjusting the magnification factor or during a focal point adjustment. The second lens group 52 includes a blur correction lens L and non-blur correction lenses M and N.

Figure 4:
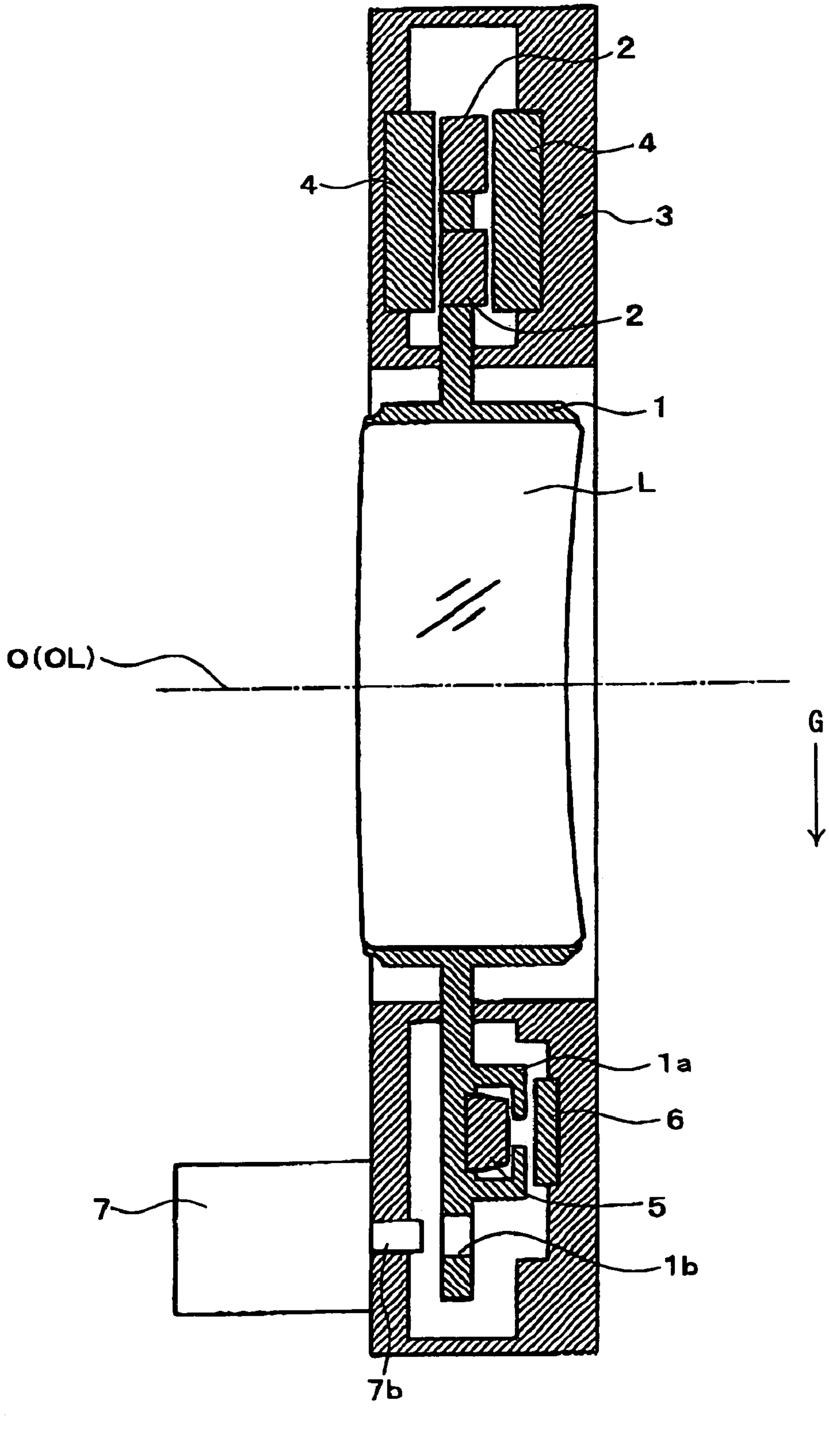
FIG. 4 shows the lens barrel of FIG. 1 in a state where the lock is released.

FIG. 4 shows a sectional view of part of the lens barrel 200 shown in FIG. 5 in a state where lock upon a blur correction device has been released. The blur correction device comprises a blur correction drive unit including a coil 2 and a magnet 4, a position detection unit including a light emission device 5 and a position detector 6, a blur correction lens L, and a lens holding frame 1, etc.

The blur correction lens L is a blur correction optical system that moves in directions intersecting the optical axis O, in particular, in two directions substantially perpendicular to the optical axis O and also substantially perpendicular to each other in order to correct image blur.

The lens holding frame 1 holds the blur correction lens L and is capable of moving in the two directions substantially perpendicular to the optical axis O of the photographic optical system.

The coil 2 is wrapped around the lens holding frame 1, and produces magnetic force as power is supplied thereto. The coil 2 forms part of a blur correction actuator, such as a voice coil motor (VCM) that generates driving force for moving the lens holding frame 1 and the blur correction lens L, with the aid of a magnet 4 described later.

A fixed frame 3 is a frame that does not move relative to the camera body 100 at which the lens barrel 200 has been mounted. The fixed frame 3 holds the lens holding frame 1, allowing the lens holding frame 1 to move in directions substantially perpendicular to the optical axis O of the photographic optical system.

The magnet 4 is a permanent magnet fixed to the fixed frame 3, and constitutes the VCM with the coil 2 described above. As power is supplied to the coil 2, the driving force is generated according to force between the coil and the magnet 4 to move the lens holding frame 1 and the blur correction lens L in the directions substantially perpendicular to the optical axis O.

The light emission device 5 is a light source, such as a LED, and is fixed to the lens holding frame 1. Light from the light emission device 5 passes through a slit 1*a*.

The position detector 6 is a position sensor, such as a position sensitive device (PSD), and is fixed to the fixed frame 3. The position detector 6 detects a position of the lens holding frame 1 along a direction perpendicular to the optical axis O, by determining the light from the light emission device 5 having passed through the slit 1*a*.

In the blur correction device, although not shown in figures, the blur correction drive unit comprising the coil 2 and the magnet 4, and the position detection unit comprising the light emission device 5 and the position detector 6 as described above are provided both in the two directions substantially perpendicular to the optical axis. The blur correction device moves the lens holding frame 1 and the blur correction lens L along the two directions substantially perpendicular to the optical axis O to a target position by the blur correction drive unit, while monitoring the position of the lens holding frame 1 with the position detection unit. The blur correction device performs feedback control, in other words, controls movement of the lens holding frame 1 and the blur correction lens L according to a displacement between the current position and the target position of the lens holding frame 1. In this way, image blur in the image plane 100*a* due to hand movement or the like can be corrected by moving the blur correction lens L along the two directions substantially perpendicular to the optical axis O.

When the blur correction is not executed, it is desirable to keep the position of the blur correction lens L at a fixed position. The lens barrel 200 according to the embodiment of the present invention includes a lock mechanism that restricts movement of the lens holding frame 1 and the blur correction lens L to lock them while the blur correction is not executed. Hereafter, explanation is given to the lock mechanism of the blur correction device according to the embodiment.

Figure 1:
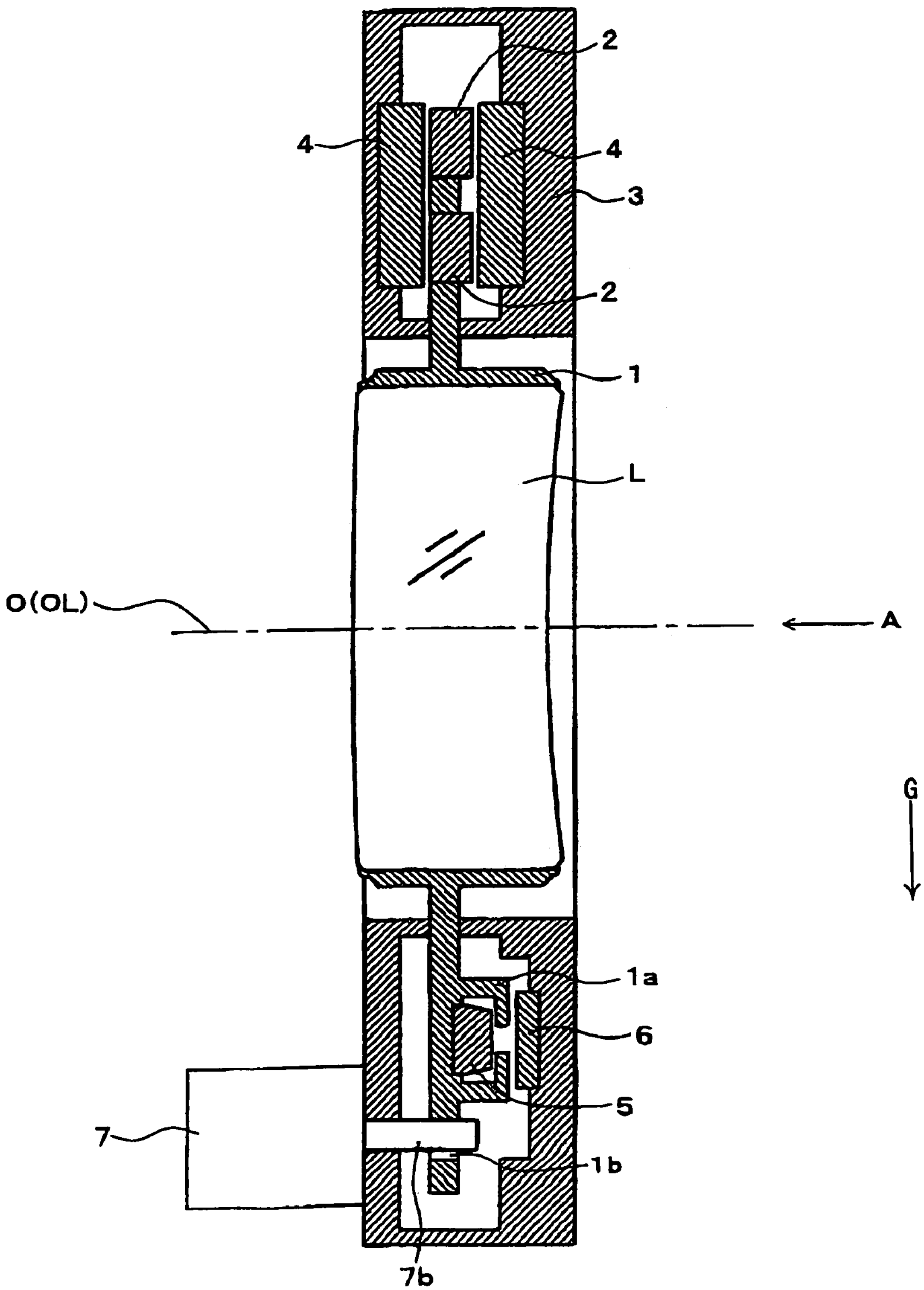
FIG. 1 is a sectional view of a lens barrel in an embodiment of the present invention, wherein a lock pin is engaged with a hole and power is not supplied to a coil.

FIG. 1 is a sectional view of part of the lens barrel 200. FIG. 1 shows the lens barrel 200 in a state where the lock pin 7*b* of the lock mechanism is engaged with the hole 1*b* of the lens holding frame 1 and no power is supplied to the coil 2.

Figure 2:
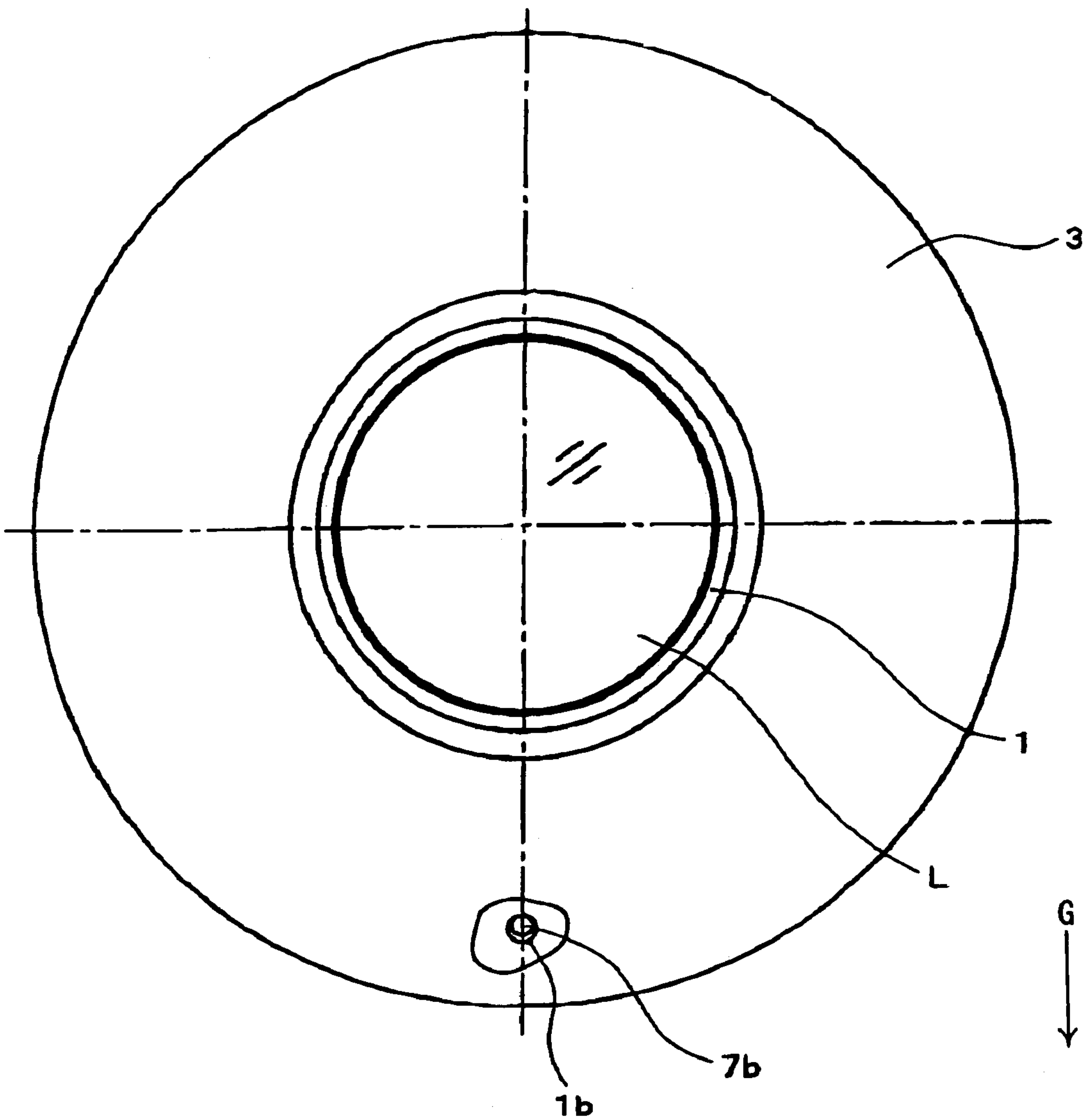
FIG. 2 shows the lens barrel of FIG. 1 viewed from a direction of arrow A, with part of a fixed frame being broken to show the details of the lens barrel.

FIG. 2 shows the lens barrel 200 of FIG. 1 viewed from a direction of arrow A, with part of the fixed frame 3 being broken to show the details of the lens barrel 200.

The lock mechanism comprises the lock pin 7*b* and the hole 1*b*. The lock pin 7*b* is a movable engaging unit driven by a latch solenoid 7. The 1*b* is a frame engaging unit provided in the lens holding frame 1, facing substantially along the direction of the optical axis O of the photographic optical system. When the blur correction is not performed, it is not necessary to move the lens holding frame 1 and the blur correction lens L. Thus, the lock pin 7*b* of the lock mechanism is moved in the direction of the optical axis O in order to be inserted into the 1*b*, as shown in FIG. 1. In this way, positions of the blur correction lens L and lens holding frame 1 are fixed or locked.

It is to be noted that the internal diameter of the 1*b* is set larger than the outside diameter of the lock pin 7*b* so that the lock pin 70*b* is inserted into the 1*b* with a high degree of reliability. That is, there exists a space or a play between the 1*b* and the lock pin 7*b*. Accordingly, the center of the lock pin 7*b* and the center of the 1*b* become eccentric or decentered by the play when the lock pin 7*b* and the 1*b* come into contact with each other by the weight of the lens holding frame 1 and the blur correction lens L. In the embodiment, the blur correction lens L is fixed to the lens holding frame 1 so that while the lock pin 7*b* and the 1*b* are decentered by the play, an optical axis OL of the blur correction lens L matches the optical axis O of the photographic optical system.

In this arrangement, the optical axis OL of the blur correction lens L can remain matched with the optical axis O of the photographic optical system while the lens holding frame 1 and the blur correction lens L are locked by the lock mechanism.

In the lens barrel 200 shown in FIGS. 1 and 2, the lock pin 7*b* of the lock mechanism is inserted into the 1*b* of the lens holding frame 1 in order to restrict movement of the lens holding frame 1 along directions substantially perpendicular to the optical axis O. The diameter of the 1*b* should be larger than the diameter of the lock pin 7*b* so that the lock pin 7*b* is inserted into the 1*b* without fail. Thus, there is a possibility that the lens holding frame 1 moves along directions perpendicular to the optical axis O within a diameter difference, that is, the play between the lock pin 7*b* and the hole 1*b*. For instance, if the lens holding frame 1 vibrates due to external influence or the like and is caused to move along the directions perpendicular to the optical axis O within the diameter difference, the image in the image plane 100*a* may be blurred in response to the movement of the lens holding frame 1.

In this embodiment, biasing force is generated by supplying power to the coil 20 to prouce force between the coil 2 and the magnet 4. This biasing force acts upon or pushes the lens holding frame 1 in the gravitational direction (a direction of arrow G) so that the lock pin 7*b* and the 1*b* being in contact with each other by the weight of the lens holding frame 1 will not be separated due to external influence or the like. In this way, it is possible to prevent the lens holding frame 1 and the blur correction lens L from moving within the diameter difference or the play along the directions perpendicular to the optical axis O due to, for instance, external influence. As a result, undesirable image blur occurring in the image plane 100*a* can be prevented.

In this embodiment, it is arranged that the biasing force always acts in a downward direction in the figures (the direction indicated by arrow G) regardless of the posture of the lens barrel 200.

Moreover, in the embodiment, the lock pin 7*b* and the 1*b* are caused to come into contact with each other as the lens holding frame 1 and the blur correction lens L moves by their own weight after the lock pin 7*b* is inserted into the hole 1*b*. However, the movement of the lens holding frame 1 is not limited to that caused by its own weight. For instance, the actuator that performs the blur correction function, in particular, the coil 2 and the magnet 4 may be used to move the lens holding frame 1 in a direction to match the optical axis OL of the blur correction lens L with the optical axis O of the photographic optical system so that the lock pin 7*b* and the 1*b* come into contact with each other. In this case, the lens holding frame 1 can move slowly compared with the movement by its own weight. Accordingly, a strange feeling that a user may have toward the subject image when the blur correction lens L and the lens holding frame 1 move can be reduced.

Output from the position detector 6 varies when the lens holding frame 1 moves within the play due to external influence or the like. In the embodiment, while the blur correction is not performed, a position where the optical axis OL of the blur correction lens L corresponds to the optical axis O of the photographic optical system is set as a target position of the lens holding frame 1, as shown in FIG. 1. The biasing force is generated so as to keep the lens holding frame 1 at the target position, that is, not to change output from the position detector 6.

As described above, power is supplied to the coil 2 to cause the biasing force to act upon the lens holding frame 1. In other words, electric power is consumed to generate the biasing force. However, this biasing force is required substantially while the image is being recorded, in particular, while the image to be recorded is being exposed onto a recording medium. Therefore, in the embodiment, power supply to the coil 2 is started immediately before taking a photograph, and is stopped when the photographing ends so as to suppress the consumption of the electric power to the minimum. For instance, power supply to the coil 2 begins in response to a shutter release button (not shown) being pressed to full extent so as to generate the biasing force.

In addition, the biasing force required is a force barely adequate to prevent the lens holding frame 1, in particular, the 1*b* from separating from the lock pin 7*b*. Therefore, the electric power consumed by the coil 2 is a little since only a little force is required as the biasing force, and it is hardly necessary to consider the consumption of the power source to generate the biasing force.

In this embodiment, it is arranged that when the lens barrel 200 is mounted at the camera body 100 as shown in FIG. 5, a direction from the optical axis O of the photographic optical system or the optical axis OL of the blur correction lens L to a bottom portion 100*b* of the camera body 100, which is indicated by arrow B corresponds to the direction G indicated in FIGS. 1 through 4.

There are a variety of screen aspect ratios in cameras, but generally an oblong screen with its width larger than its height is used. Most cameras produce oblong images when they are held in a normal position or a horizontal position. In this embodiment, when a user holds the camera system with the lens barrel 200 mounted at the camera body 100 so that the bottom portion 100*b* of the camera body 100 faces downward, which means that the arrow B indicates the gravitational direction, the downward direction in FIG. 5 corresponds to the direction G indicated in FIGS. 1 through 4. In other words, when a user holds the camera in a horizontal position, setting a width of a screen larger than its height, the direction G indicated in FIGS. 1 through 4 corresponds to the gravitational direction.

By this arrangement, if a user holds the camera system at a horizontal position so that the bottom portion 100*b* of the camera body 100 faces downward while the blur correction device is locked, the lock pin 7*b* and the 1*b* become decentered by weight of the lens holding frame 1, causing the optical axis OL of the blur correction lens L to match the optical axis O of the photographic optical system.

As described above, the optical axis OL of the blur correction lens L and the optical axis O of the photographic optical system match when the lens holding frame 1 has moved by its own weight in the gravitational direction of the camera being held in the most common position. In this way, it is likely the optical axis OL of the blur correction lens L matches the optical axis O of the photographic optical system even when the biasing force does not act on the lens holding frame 1. Therefore, by generating a little biasing force to act on the lens holding frame 1, it is possible to position the optical axis OL of the blur correction lens L on the optical axis O of the photographic optical system with a high degree of reliability. It is also possible to position the optical axis OL of the blur correction lens L on the optical axis O of the photographic optical system by causing the lock pin 7*b* and the hole 1*b* to come into contact with each other due to gravity without generating the biasing force to the lens holding frame 1.

If a user holds the camera in a vertical position while the blur correction device is locked, the lens holding frame 1 also moves within the diameter difference between the lock pin 7*b* and the 1*b* in the gravitational direction, that is, a direction substantially perpendicular to the drawing papers of FIGS. 1 through 5 (hereafter, referred to as a direction G'). If a position that the optical axis O of the photographic optical system matches the optical axis OL of the blur correction lens L along the direction G' is also set as a target position, output signal from the position detector 6 that detects a position of the lens holding frame 1 along the direction G' varies as the lens holding frame 1 is displaced from the target position. The biasing force is generated to act upon the lens holding frame 1 through feedback control from immediately before photographing so that output signal from the position detector 6 does not change. In this way, the optical axis OL of the blur correction lens L remains on the optical axis O of the photographic optical system while photographing, and it is possible to obtain best photographic results.

Figure 3:
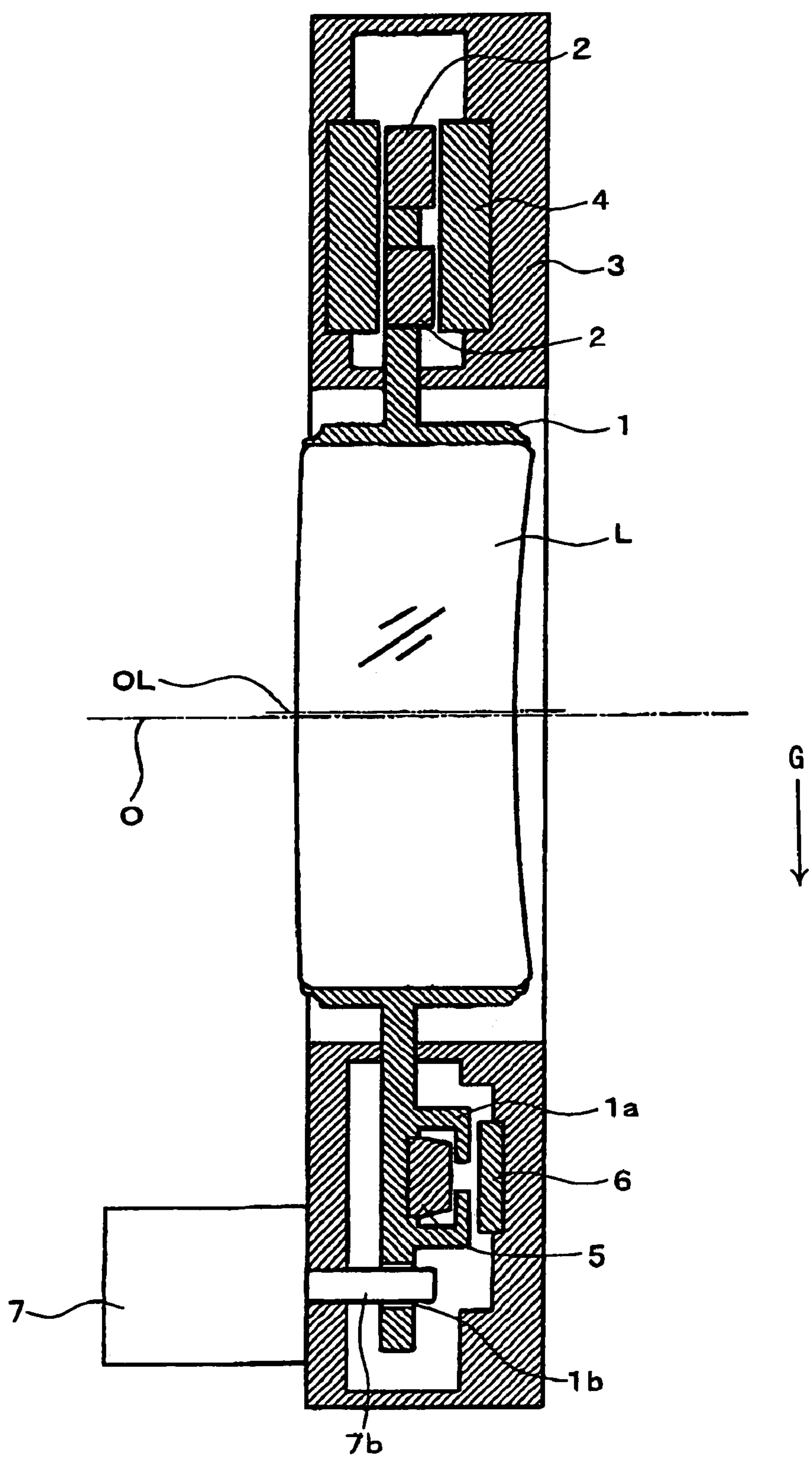
FIG. 3 shows the lens barrel of FIG. 1 in a state where the lock pin has just engaged with the hole.

FIG. 3 shows the lens barrel 200 when the lock pin 7*b* has just engaged with the hole 1*b*. In this embodiment, for executing locking operation, power is supplied to the coil 2, monitoring the position of the lens holding frame 1 with the position detector 6, so as to move the lens holding frame 1 and the blur correction lens L to the position where the axial center of the lock pin 7*b* and the center of the 1*b* match. In the state that the axial center of the lock pin 7*b* corresponds to the center of the 1*b*, the optical axis OL of the blur correction lens L and the optical axis O of the photographic optical system are eccentric and do not match. Under such a condition, the optical performance of the photographic optical system slightly deteriorates, but it does not cause any problems since photographing is not performed.

From this state, the latch solenoid 7 is driven so as to move and insert the lock pin 7*b* into the 1*b*, as shown in FIG. 3.

The internal diameter of the 1*b* is set larger than the outside diameter of the lock pin 7*b*. Therefore, the lock pin 7*b* can be reliably inserted into the 1*b* even if the positions of the lock pin 7*b* and the 1*b* are slightly displaced due to error in drive control of the lens holding frame 1 or even if there is variation in the internal diameter of the 1*b* and the outside diameter of the lock pin 7*b* having been manufactured.

From the state shown in FIG. 3, power supply to the coil 2 is stopped, or alternatively power is supplied to the coil 2 to apply force to the lens holding frame 1 in the direction G. Accordingly, the lock pin 7*b* and the 1*b* come into contact with each other, and the optical axis O of the photographic optical system and the optical axis OL of the blur correction lens L match. Thus, the lock operation is completed.

According to the present invention, since the optical axis OL of the blur correction lens L always corresponds to the optical axis O of the photographic optical system when photographing without executing blur correction, it is possible to obtain the best performance from the photographic optical system.

(Modes of Variation)

The present invention is not limited to the embodiment explained above and allows for variations and modifications which are equally within the scope of the present invention.

For instance, in the above described embodiment, explanation was given to an example that the biasing force to the lens holding frame 1 was always applied to the same direction. However, the present invention is not limited to this example. It is also possible to install a gravity sensor and apply the biasing force using the coil 2 and the magnet 4 in the gravitational direction determined by the gravity sensor.

Moreover, in the above described embodiment, explanation was given to an example that the lens holding frame 1 was pushed in a predetermined direction, that is, the direction G with the biasing force. However, the present invention is not limited to this example. The biasing force may not be applied to the lens holding frame 1 if the optical axis OL of the blur correction lens L and the optical axis O of the photographic optical system can match when the lens holding frame 1 has fallen by gravity force.

In addition, in this embodiment, explanation was given to an example that when pushing the lens holding frame 1 in the gravitational direction using the coil 2 and the magnet 4, an adequate biasing force was generated through feedback control so that output signal from the position detector 6 would not change. However, the present invention is not limited to this example. For example, the lens holding frame 1 may always be pushed in the predetermined direction regardless of output signal from the position detector 6 when photographing without executing blur correction.

In the above described embodiment, it was explained that the lens barrel 200 was to be detachably mounted at the camera body 100 to form a camera system. However, the lock mechanism of the blur correction device described above may also be installed in a camera at which the lens barrel 200 and the camera body 100 integrate or cannot be detached. Moreover, the lock mechanism of the blur correction device described above may be used for a video camera that takes dynamic images, or the like.

As described above, according to the embodiment of the present invention, the following advantages can be achieved.

(1) The optical axis OL of the blur correction lens L matches the optical axis O of the photographic optical system (a main optical system) when the movable engaging portion 7*b* and the frame engaging portion 1*b* are in contact with each other, after the movable engaging portion 7*b* moves to a position to engage with the frame engaging portion 1*b* and the blur correction lens L and the lens holding frame 1 move in the predetermined direction. As a result, the optical performance of the photographic optical system when the blur correction is executed can be improved.

(2) The predetermined direction in which the blur correction lens L and the lens holding frame 1 are caused to move by their own weight corresponds to a direction from the optical axes O and OL to the bottom portion 100*b* of the camera body 100 at which the lens barrel 200 has been mounted. In this way, the optical performance of the photographic optical system can be improved while the camera is used at the most common position, increasing the chances of taking a photograph under better conditions.

(3) A biasing device is provided, that applies force to the lens holding frame 1 and the blur correction lens L along a direction intersecting with the optical axis O of the main optical system when the movable engaging portion 7*b* has moved to a position to engage with the frame engaging portion 1*b*. As a result, when the blur correction is not executed, the blur correction lens L can be stabilized with a high degree of reliability.

(4) The optical axis OL of the blur correction lens L and the optical axis O of the main optical system match when the movable engaging portion 7*b* and the frame engaging portion 1*b* are caused to be in contact with each other by the biasing device. As a result, the optical performance of the photographic optical system when the blur correction is not performed can be improved.

(5) The biasing device is the blur correction drive unit, and thus the blur correction lens L can be stabilized without installing a separate member.

(6) The direction along which the biasing device applies the force to the lens holding frame 1 and the blur correction lens L corresponds to a direction from the optical axis O of the photographic optical system or the optical axis OL of the blur correction lens L to the bottom portion 100*b* of the camera body 100 at which the lens barrel 200 has been mounted. In this way, the optical performance of the photographic optical system can be improved while the camera is used at the most common position, increasing the chances of taking a photograph under better conditions.

(7) The biasing device starts applying the force to the lens holding frame 1 immediately before photographing and continues applying the force at least while photographing. As a result, only a little electric power is required for applying the force so that the electric power can be used effectively.

(8) The frame engaging portion 1*b* is a 1*b* provided in the lens holding frame 1, facing substantially along the optical axis O of the main optical system. The movable engaging portion 7*b* is a lock pin 7*b* capable of being inserted into the hole 1*b*. In this way, the blur correction lens L can be stabilized, without modifying the structure of the lock mechanism in the related art, and thus it is possible to provide a low cost and reliable lens barrel.

The above-described embodiments are examples, and various modifications can further be made without departing from the spirit and scope of the invention.

What is claimed is:

1. A lens barrel, comprising:

a main optical system;

a blur correction optical system included in the main optical system, that corrects image blur by moving along directions intersecting an optical axis of the main optical system;

a lens holding frame that holds the blur correction optical system and is allowed to move along the directions intersecting the optical axis of the main optical system;

a blur correction drive unit that drives the blur correction optical system and the lens holding frame; and a lock mechanism that restricts movement of the blur correction optical system and the lens holding frame, leaving a play, when blur correction is not executed; wherein:

the lock mechanism comprises a frame engaging portion provided at the lens holding frame and a movable engaging portion that is capable of engaging with the frame engaging portion;

an optical axis of the blur correction optical system matches the optical axis of the main optical system when the movable engaging portion and the frame engaging portion are in contact with each other, after the movable engaging portion moves to a position to engage with the frame engaging portion and the blur correction optical system and the lens holding frame move in a predetermined direction by the play.

2. A lens barrel according to claim 1, wherein:

the predetermined direction corresponds to a direction from the optical axis to a bottom portion of a camera body at which the lens barrel has been mounted.

3. A lens barrel according to claim 1, wherein the lock mechanism restricts the movement when no power is supplied.

4. A lens barrel according to claim 1, wherein:

the frame engaging portion is a hole provided in the lens holding frame, facing substantially along the optical axis of the main optical system; and the movable engaging portion is a lock pin capable of being inserted into the hole.

5. A camera system, comprising:

a camera body; and a lens barrel according to claim 1.

6. A lens barrel, comprising:

a main optical system;

a blur correction optical system included in the main optical system, that corrects image blur by moving along directions intersecting an optical axis of the main optical system;

a lens holding frame that holds the blur correction optical system and is allowed to move along the directions intersecting the optical axis of the main optical system;

a blur correction drive unit that drives the blur correction optical system and the lens holding frame;

a lock mechanism that restricts movement of the blur correction optical system and the lens holding frame when blur correction is not executed, the lock mechanism comprising a frame engaging portion provided at the lens holding frame and a movable engaging portion that is capable of engaging with the frame engaging portion; and a biasing device that applies force to the lens holding frame and the blur correction optical system along a direction intersecting with the optical axis of the main optical system when the movable engaging portion has moved to a position to engage with the frame engaging portion.

7. A lens barrel according to claim 6, wherein:

an optical axis of the blur correction optical system and the optical axis of the main optical system match when the movable engaging portion and the frame engaging portion are caused to be in contact with each other by the biasing device.

8. A lens barrel according to claim 7, wherein:

the biasing device is the blur correction drive unit.

9. A lens barrel according to claim 7, wherein:

the direction along which the biasing device applies the force to the lens holding frame and the blur correction optical system corresponds to a direction from the optical axes to a bottom portion of a camera body at which the lens barrel has been mounted.

10. A lens barrel according to claim 7, wherein:

the main optical system is a photographic optical system that forms an image of a subject to be photographed; and the biasing device starts applying the force to the lens holding frame and the blur correction optical system immediately before photographing and continues applying the force at least while photographing.

11. A lens barrel according to claim 6, wherein:

the biasing device is the blur correction drive unit.

12. A lens barrel according to claim 11, wherein:

the direction along which the biasing device applies the force to the lens holding frame and the blur correction optical system corresponds to a direction from the optical axis to a bottom portion of a camera body at which the lens barrel has been mounted.

13. A lens barrel according to claim 11, wherein:

the main optical system is a photographic optical system that forms an image of a subject to be photographed; and the biasing device starts applying the force to the lens holding frame and the blur correction optical system immediately before photographing and continues applying the force at least while photographing.

14. A lens barrel according to claim 6, wherein:

the direction along which the biasing device applies the force to the lens holding frame and the blur correction optical system corresponds to a direction from the optical axis to a bottom portion of a camera body at which the lens barrel has been mounted.

15. A lens barrel according to claim 14, wherein:

the main optical system is a photographic optical system that forms an image of a subject to be photographed; and the biasing device starts applying the force to the lens holding frame and the blur correction optical system immediately before photographing and continues applying the force at least while photographing.

16. A lens barrel according to claim 6, wherein:

the main optical system is a photographic optical system that forms an image of a subject to be photographed; and the biasing device starts applying the force to the lens holding frame and the blur correction optical system immediately before photographing and continues applying the force at least while photographing.

17. A lens barrel according to claim 6, further comprising:

a position detection device that detects a position of the blur correction optical system; wherein:

the biasing device applies the force to the lens holding frame and the blur correction optical system based upon a change in the position of the blur correction optical system detected by the position detection device.

18. A lens barrel according to claim 6, wherein:

the frame engaging portion is a hole provided in the lens holding frame, facing substantially along the optical axis of the main optical system; and the movable engaging portion is a lock pin capable of being inserted into the hole.

19. A camera system, comprising:

a camera body; and a lens barrel according to claim 6.

* * * * *